E. M. BUTLER.
RESILIENT VEHICLE WHEEL.
APPLICATION FILED NOV. 20, 1907.
1,095,956.
Patented May 5, 1914.
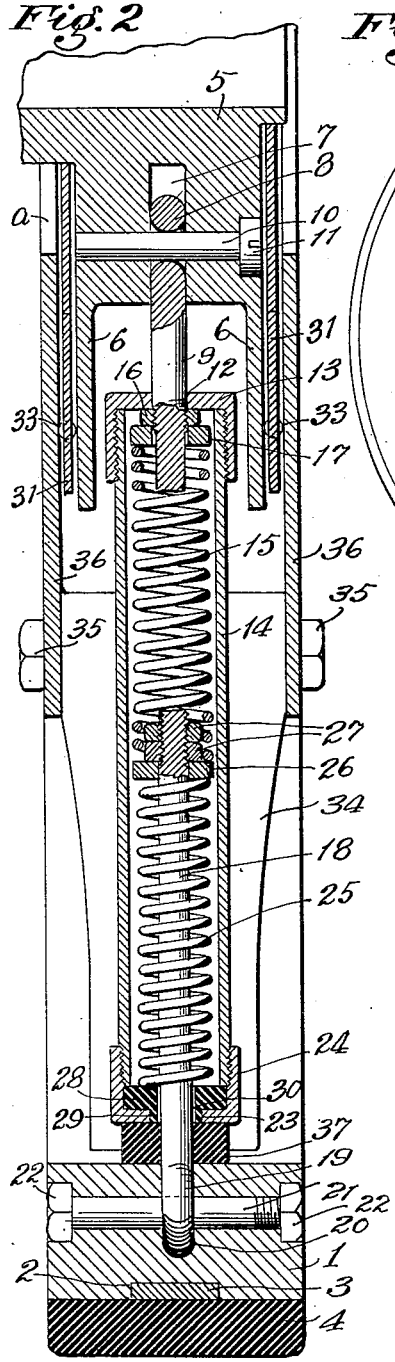
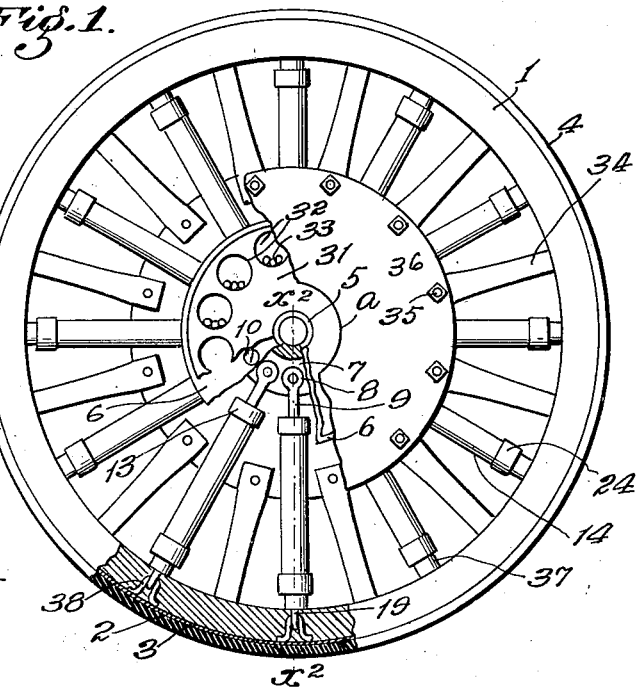
Witnesses
C. E. Holly
W. B. Townsend
Inventor
Edwin M. Butler.
by James R. Townsend
his Atty

UNITED STATES PATENT OFFICE.

EDWIN M. BUTLER, OF LOS ANGELES, CALIFORNIA.

RESILIENT VEHICLE-WHEEL.

1,095,956.  Specification of Letters Patent. Patented May 5, 1914.

Application filed November 20, 1907. Serial No. 403,070.

*To all whom it may concern:*

Be it known that I, EDWIN M. BUTLER, a citizen of the United States, residing at Los Angeles, in the county of Los Angeles and State of California, have invented a new and useful Resilient Vehicle-Wheel, of which the following is a specification.

An object of this invention is to provide an efficient and satisfactory substitute for pneumatic tires.

Other objects will appear from the following specification.

The accompanying drawings illustrate a form of the invention which I at present deem most desirable.

Figure 1 is a side elevation of a wheel constructed in accordance with my invention, the central portion of the same being shown in fragment to disclose the interior construction, and part of the rim being also shown in fragment to show the method of securing the spokes to the rim. Fig. 2 is an enlarged fragmentary section of a modified form of the invention on lines $x^2$—$x^2$, Fig. 1, with all the parts in place.

1 designates the rim of a wheel provided with a peripheral countersink 2 to accommodate a metallic band 3, preferably of steel, which is set in the countersink, to strengthen the wheel. Around the rim 1 and steel band 3 may be placed a cushion 4 of any suitable material such as rubber or leather.

5 is a hub provided with flanges 6 and with a circular slot 7 to receive an eye 8 provided on the hub-spoke-rod 9.

10 is a bolt extending through the eye 8 of the spoke-rod 9, the head 11 of said bolt 10 being countersunk in the hub flange 6 so as to be flush with the sides of the same and prevent unnecessary protrusion therefrom.

The hub-spoke-rod 9 extends within the bore 12 of the cap 13 which is slidable along said hub-spoke-rod and which is screwed onto a sleeve 14 containing a coil spring 15. A nut 16 is provided on the end of the spoke-rod 9 and a washer or disk 17 is also fitted on the spoke-rod 9, the nut 16 being interposed between said washer or disk 17 and the inner face of the screw-cap 13.

18 designates a rim-spoke-rod provided with an eye 19 extending in a slot 20 provided in the rim 1, the said eye 19 being arranged to receive a bolt 21 extending through the rim 1 and having the heads 22 thereof countersunk in the rim 1. The said rim-spoke-rod 18 extends within the sleeve 14 and through the bore 23 provided in the cap 24 which is screwed onto the sleeve 14. A spring 25 is coiled about the shank of the rod 18, which rod has provided on its extremity a washer or disk 26 slidable along the rim-spoke-rod 18 and which is provided with set-nuts 27.

From the foregoing it is seen that the hub-spoke-rod 9, sleeve 14 and rim-spoke-rod 18 constitute a three-part spoke, the members of which are connected together by the springs 15, 25, and it is furthermore seen that the hub-spoke-rod 9, sleeve 14, rim-spoke-rod 18, springs 15 and 25, and caps 13 and 24 constitute a resilient spoke pivotally connected to the rim 1 and to the hub 5.

Within the cap 24 is a compressible washer 28, preferably of rubber, which is provided with a neck or collar 29. This neck 29 of the rubber washer 28 extends in the bore 23 of the cap 24, and is also provided with a bore or opening 30 which is of slightly larger diameter than the diameter of the rim-spoke-rod 18. The neck of this compressible washer is intended to prevent the rattling of the rod 18 by holding it free from contact with the cap.

31 is a ball-frame provided with a plurality of openings 32 for the reception of one or more balls 33. This frame may consist of a fibrous disk mounted on the hub of the vehicle wheel.

34 designates rigid wheel-spokes which terminate at a point between the inner rim of the wheel and the hub thereof. To these spokes are secured on opposite sides of the same disks or plates 36 by means of bolts 35. These disks or plates being spaced from said hub in a radial direction leave the hub free to move radially relative to the rim and the anti-friction balls 33 between the hub and the plates assist to complete, in conjunction with the spokes and the rim of the wheel, a perfectly strong wheel construction.

The aforementioned ball-frame 31, as will be seen from the sectional illustration in Fig. 2, is interposed between the disks 36 and the flanges 6 of the hub, and the balls 33 in the orifices 32 of said ball-frame 31 are provided to reduce the friction incident to the movement of the hub relatively to the stationary part of the wheel; that is to say, when the hub becomes eccentric to the wheel-rim.

Interposed between the outer face of the screw-cap 24 and the inner face of the rim 1 is a compressible washer 37 to yieldingly close the space between the cap and the rim, and to allow the sleeve to cant when the spokes are caused to assume a tangential position, which occurs when the hub becomes eccentric with the wheel.

Instead of employing the method of securing the rim-spoke-rods 18 to the rim, as illustrated in Fig. 2, I may employ staples 38, seen in Fig. 1, which engage the eyes of the rim-spoke-rods, and which staples are arranged to be driven through the rim to the outside thereof where they are upset to lie flush with the surface. In Fig. 2 the springs 15 and 18 are shown expanded to bring the nut 16 against the cap 13 as occurs when there is no load on the wheel. In practical operation the springs 15 and 25 will be normally compressed to some extent by the weight imposed on them through their connections with the vehicle, the cap 13 freely sliding along the hub-spoke-rod 9 and the disk 26 freely sliding along the rim-spoke-rod 18. When shock is produced downward through the vehicle axle (not shown) or upward through the wheel rim 1, the springs 15, 25 at the lower part of the wheel will be compressed beyond the normal degree and the corresponding springs 15 at the upper portion of the wheel will expand sufficiently while the springs 25 will be compressed. When the rim 1 and hub 5 are thus relatively deflected the hub-spoke-rods 9 at the side portions of the wheel will turn on the bolts 10 and the corresponding rim-spoke-rods 18 will turn on the bolt 21 in Fig. 2 or on staples 38 in Fig. 1, thus canting the sleeves 14 at said side portions in the plane of the wheel, such canting being compensated for at the outer end of the sleeves by the compressible washer 37.

I claim:—

1. In a wheel, the combination with the rim and hub, of a plurality of spokes each comprising a rim-spoke-rod pivoted to the rim, a hub-spoke-rod pivoted to the hub, a sleeve slidable along said spoke-rods and provided at the ends with caps, nuts screw-threaded on the ends of said rods inside of the sleeve, a disk slidable along the rim-spoke-rod, a spring extending between one of said nuts and the disk, and a spring extending between the disk and one of said caps.

2. In a wheel, the combination with the rim and hub; of a plurality of resilient spokes each comprising a rim-spoke-rod pivoted to the rim, a hub-spoke-rod pivoted to the hub, nuts on the free ends of said rods, a disk slidable along the rim-spoke-rod, a sleeve surrounding said nuts and provided at its ends with caps, a spring between one of said nuts and said disk, a spring between one of said caps and the disk, flanges on the hub; plates; rigid spokes connecting the plates to the rim; ball-frames mounted on the hub between the flanges and the plates and provided with openings; and balls in said openings.

3. The combination with a channeled hub and a rim, of resilient two-part spokes connecting said hub and rim, each comprising a casing; a bolt pivoted to the rim extending through the casing; a spring around said bolt; nuts on said bolt to compress the spring, said spring serving to hold the casing toward the rim, a second bolt being pivoted to the hub and extending into the casing; a spring in the casing to coöperate with the first-mentioned spring, and a bolt pivoted to the hub and extending inside the casing to press the second spring.

In testimony whereof, I have hereunto set my hand at Los Angeles, California, this 11th day of November, 1907.

EDWIN M. BUTLER.

In presence of—
JAMES R. TOWNSEND,
ANTON GLOETZNER.